Feb. 28, 1950      F. A. WHITELEY      2,498,973
AUTOMOBILE COOLING AIR CONDITIONER Filed Oct. 25, 1947      2 Sheets-Sheet 1

Inventor
FRANK A. WHITELEY
BY *F. A. Whiteley*
Attorney

Patented Feb. 28, 1950

2,498,973

UNITED STATES PATENT OFFICE 2,498,973

AUTOMOBILE COOLING AIR CONDITIONER

Frank A. Whiteley, Minneapolis, Minn.

Application October 25, 1947, Serial No. 782,092

20 Claims. (Cl. 62—117)

My invention relates to automobile cooling air conditioners, and has for its object to provide a complete unit in a unitary casing adapted to be rested upon an automobile floor, with part of the casing projecting through the automobile floor, and having in the casing above the automobile floor a container of water formed externally of the water chamber as a heat exchanger, and having below the floor a rotary evacuator for producing a very low vacuum in the water container, with surrounding means exposed to outdoor atmosphere for withdrawing heat of compression against atmospheric pressure.

My invention constitutes an improvement upon and a development of my Patent No. 2,352,748, granted July 4, 1944, and is designed to carry out and accomplish the purposes of said patent in an improved and more efficient way.

It is a principal object of my invention to provide a casing member having all of its parts united in a single unit adapted to be rested upon an automobile floor with a portion of said member above the floor and another part below the floor.

It is a further object of my invention to form the part of the member above the floor as a combined water holding tank and heat exchanger.

It is a further object of my invention to form in the part of the member below the floor a rotary evacuator having gas inlet connection with the space within the adjacent tank above the water level therein, together with driving means, for drawing gas (water vapor) from said chamber to produce a very low vacuum therein and cause evaporation of the water in the chamber.

It is a further object of my invention to provide, in the portion of the member below the floor, driving means for the evacuator and an oiling system similar to that described in my aforementioned pending application, but with novel means of returning and controlling the oil used in the oiling system.

It is a further object of my invention to form gas compressing impellers (sometimes called vanes) of substantial mass, with parallel plane-surfaced walls and a thick body between them, and to form the ends thereof between the walls as parts of true cylinders.

It is a further object of my invention to form the part of the casing below the floor of the automobile with an arrangement of external fins which will be subject to the currents of air passing around it as an automobile is driven.

It is a further object of my invention to accumulate the water of condensation formed on and drained from the walls of the heat exchanger and to discharge it so as to contact the fins of the cooling portion of the unit and by the evaporation of the said water to increase the heat withdrawing effect of what would otherwise be air cooling.

It is a further object of my invention to provide in the part of the casing below the floor of the automobile a two-part sump, each part separated from the other excepting for the passage ways from the respective parts to the gear pumps, and to arrange self-leveling means for filling the respective sump sections with oil independently and other means for draining liquid from the bottom of said sumps independently.

It is a further object of my invention to drive all moving parts including the rotor of the pump, the pistons of the rotor, the oiling means and the fan for circulating air through the heat exchanger from a single source of power and by a single vertical shaft, the shaft for the fan or blower extending through the center of the part of the casing above the floor, with intervening gearing for suitably reducing the speed of said last named shaft.

The full objects and advantages of my invention will appear in the description thereof given in the following specification, and the novel features of the invention by which the aforementioned advantageous results are obtained will be particularly pointed out in the claims.

In the drawings illustrating an application of my invention in one form.

As shown in the drawings, my invention comprises a unitary member formed of an upper casing portion designated generally by the numeral 10 and a lower casing portion similarly designated by the numeral 11.

The upper casing portion has an annular base portion 12 which is adapted to overlie a floor portion 13 of an automobile, and which rests thereon, said floor portion being provided with an opening 14 through which the lower casing portion 11 is projected. Said lower casing portion likewise is provided with an annular rim 15. The two casing portions are held together as a unit by screwbolts 16 which, after the two casing portions have been completely assembled are passed through rim 15 and threaded into rim 12 and a thickened part 17 thereon.

By these means the two casing portions are rigidly united into a unitary structure and the lower casing part is suspended from the upper casing part in a position below the floor 13 of the automobile.

The upper casing part comprises an outer shell 18, which may be insulated if that is deemed desirable, and a cylindrical tank member 19. The tank member is provided with a lower wall 20, Figs. 1 and 5, and an upper wall 21, Fig. 1. To effect a gas-tight union, the bottom member 20 is preferably welded to a horizontal flange 22 turned inwardly from the cylinder wall 19, and the top member 21 is likewise preferably welded to a downturned flange member 23.

Extending longitudinally, or vertically as the unit must be positioned, through the chamber 24 within tank cylinder 19 are a multiplicity of tubes 25, which are preferably externally welded at their outer ends to the bottom and top walls 20 and 21, as indicated at 26 and 27 respectively. These tubes perform the double function of providing adequate supports for the two ends of the members against air pressure when vacuum is produced in the chamber 24 and providing vertical heat exchange air passages through the said tank.

Figure 5:
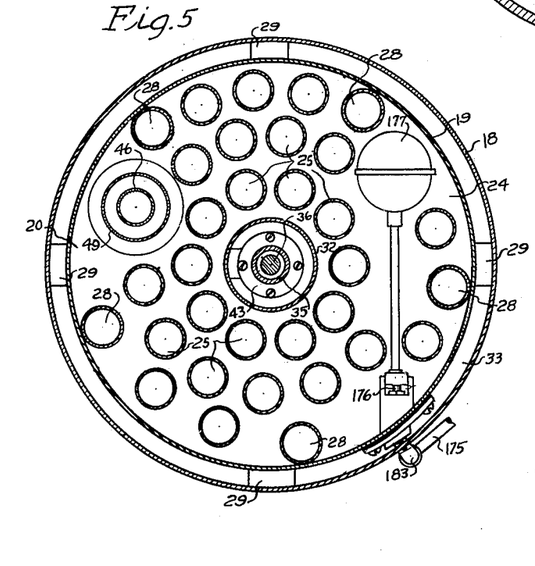
Fig. 5 is a transverse sectional view taken on line 5—5 of Fig. 1.

Five of these tubular members designated by the numeral 28, Fig. 5, are welded in a position so that they contact inside of the cylinder 19 and thereby provide sufficient support against high air pressure upon the outside wall of cylinder 19.

Figures 1, 8:
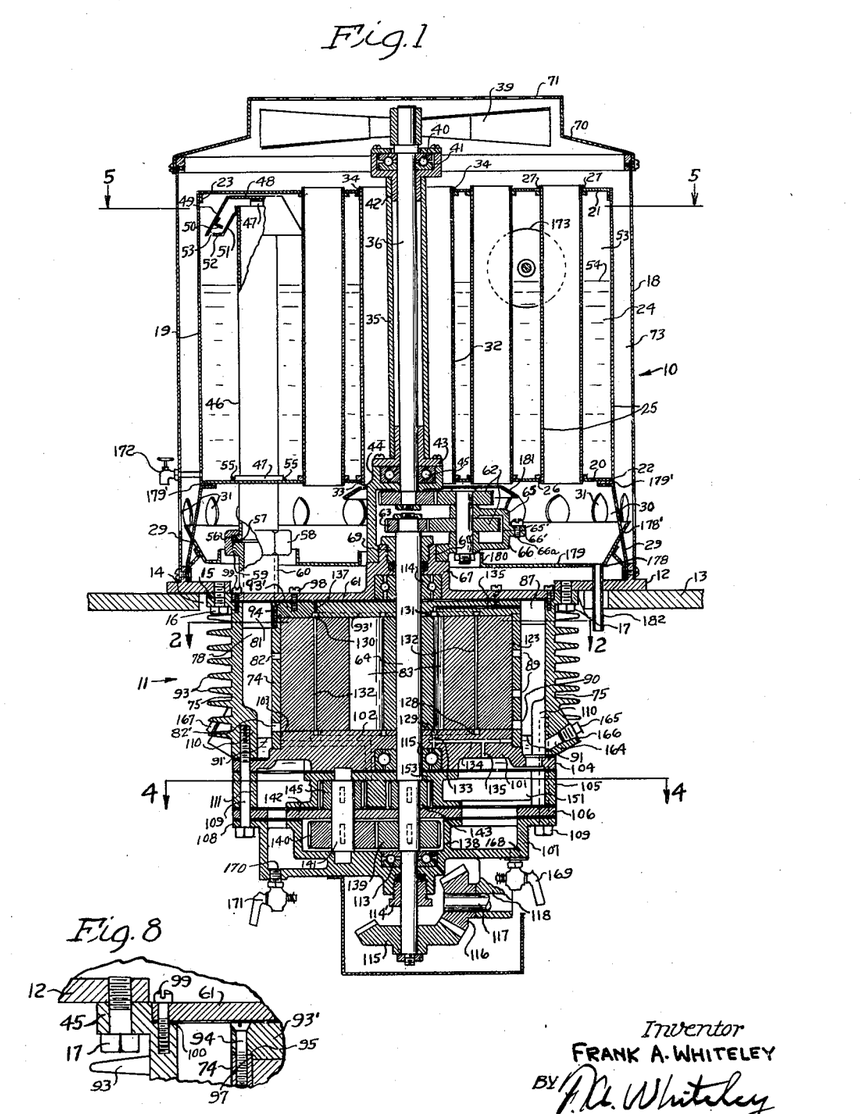
Fig. 1 is a sectional elevation view taken on line 1—1 of Figs. 2 and 4 extending through the entire apparatus as the same is positioned on the automobile floor.
Fig. 8 is an enlarged sectional view of a portion of what is shown in Fig. 1.

Cylinder 19 is held spaced from the top plane of flange 12 by a set of legs 29, Figs. 1 and 5. This provides a space or chamber 30 below the bottom wall 20 of the tank with a multiplicity of openings 31 through that wall to admit free circulation of air from the outside of the unit into the chamber 30.

A larger tube or cylinder 32 extends centrally between the bottom and top walls 20 and 21 of the tank 19 and is welded to these walls as indicated at 33 and 34. Centrally positioned within this tube is a heavy tube 35 through which extends a shaft 36 having at its upper end a fan member 39. The shaft 36 has bearing support 40 through a casing section 41 having a portion 42 extending within and supported by the heavy tube 35. This tube in turn is supported by casing member 43, which is rested upon a casting 44 containing a lateral bearing 45 for shaft 36.

Also positioned within the chamber 24 of the tank 19 is an air exhaust tube 46, which has secured to its upper end by a brace member 47, a cap 48 having outwardly flaring semi-conical walls 49 and having an internal annular flange 50 which is turned inwardly and downwardly as shown in Fig. 1. A second conical member 51, secured about tube 46, extends downwardly and is provided with an annular horizontal lip 52 leaving a narrow annular passageway 53 between the edge of flange 52 and the bottom edge of the member 49.

This arrangement causes trapping of any water and allows air or water vapor to be drawn from a portion 53 of chamber 24 above the water level 54 in said chamber. At the same time, while permitting this gas to be drawn freely into and through tubular member 46, water is effectively prevented from entering the passageway through said tubular member.

The tube 46 is provided with a flange 47 welded thereto, which flange is welded air-tight at 55 to the bottom wall 20. Tubular member 46 is surrounded by a bottom annular flange 56, which is held in gas-tight contact with a gasket 57 by means of a nut 58 threaded upon a thickened portion 59 of a short tube 60. The tube 60 is in turn welded to and opens through a plate 61, later to be described. This arrangement permits assembly in gas-tight relation of the upper and lower casing sections 10 and 11.

The shaft 36 is driven by reduction gearing 62 from a pinion 63 fast on the main driveshaft 64, which will later be described. The reduction gearing may be of any suitable and well-known type, and is supported by casting sections 65 and 66. Section 66 is formed as a part of casting 44 heretofore described, which rests upon a top plate member 67 surrounding an annular extension 68 thereof which is internally threaded and has threaded thereinto a packing nut 69. A cap member 70, formed with the top grill 71 encloses a chamber 72 into which the tubular passages 25, 28 and 32 and annular passage 73 discharge, and which forms a fan casing. The casting members 65 and 66 are provided with contacting flanges 65' and 66' held together by screws 66a.

With the above arrangement, it will be obvious that when the fan 39 is in operation, air will be drawn from the automobile compartment through the openings 31 into chamber 30 and from there through the heat exchange passageways 25, 28 and 32 and the annular passageway 73 between the outer wall of tank 19 and inner wall of shell 18 and will be discharged through the grill 71 into the automobile compartment.

The casing part 10, as above described in detail, is mounted within the automobile chamber, and comprises an evaporator heat exchanger through which the air within the compartment is circulated, the heat exchange surfaces of which are directly cooled by cold water in the tank. Water supplied to the chamber 24, by means hereinafter described, is caused to evaporate by producing a very low degree of vacuum in the part 53 of said chamber above the water level 54. The means for causing this vacuum will now be described.

Figure 2:
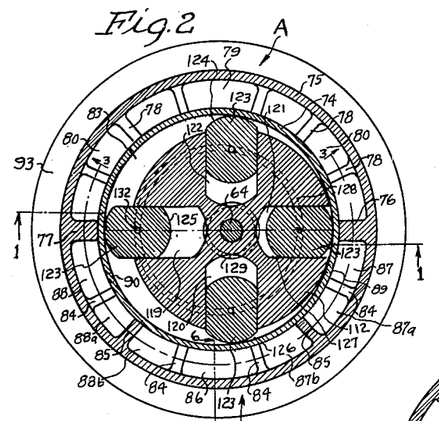
Fig. 2 is a sectional view taken on line 2—2 of Fig. 1 viewed in the direction of the arrows.
Figure 4:
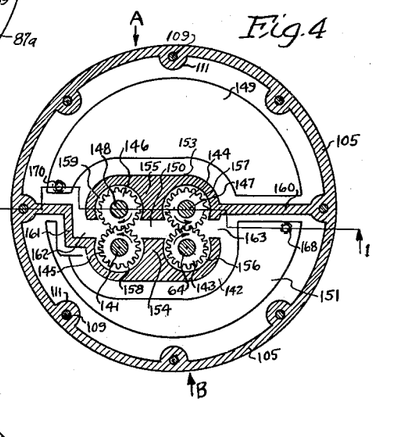
Fig. 4 is a sectional view taken on the line 4—4 of Fig. 1.

These means are shown in Figs. 1, 2 and 4. As shown in Fig. 2, there is an inner cylinder 74 and an outer cylinder 75. The outer cylinder has connected therewith a pair of ribs 76 and 77 which are diametrically opposed and which are continued downwardly, in a manner hereinafter pointed out, to divide the space between cylinders 74 and 75 and the parts below into two separated chambers, which are respectively at the high pressure side and the low pressure side of the rotary gas evacuating pump, and which are connected on opposite sides of the dividing partition with separated oil sumps, hereinafter to be described.

Figure 3:
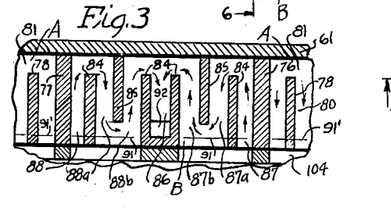
Fig. 3 is a sectional schematic view taken on line 3—3 of Fig. 2 with the parts in flat projection and on a smaller scale than Fig. 2.

A multiplicity of ribs 78 on the low pressure side A are connected with the cylinder 75 and extend between it and cylinder 74 leaving a longitudinal central passageway 79 and side passages 80. As shown in Fig. 3, and by full lines in Fig. 2, the ribs 78 terminate short of the tops of the cylinders 74 and 75 leaving a passageway above all said tops indicated in Figs. 1 and 3 at 81.

The short tube 60, connected with the gas tube 46, opens directly into the semi-annular passageway 81 and from there has connection with all of the passageways 79 and 80 about the low pressure side A of cylinder 74.

Apertures 82 and 82', Fig. 1, lead through the wall of cylinder 74 into the crescent-like chamber 83, Fig. 2, inside said cylinder and into each of the vertical passageways 79 and 80 on the low pressure or inlet side of the evacuating pump later to be described. Other apertures 89 and 90 also lead through cylindrical wall 74 from the high pressure side B into crescent-shaped chamber 83. All the apertures 82 and 82' function to admit gas (water vapor) into the low pressure side of chamber 83, and all the apertures 89 and 90 function to discharge the water vapor gas from the high pressure side of chamber 83. The apertures 82' and 90 opening at the level of the bottom wall of chamber 83 also function to permit drainage of oil from the space between cylinder walls 74 and 75 to the respective low side A and high side B sumps later to be described.

By these means, the water vapor is thus evacuated from chamber 53 of the evaporator and very low pressure is effected in that manner in chamber 53.

Two sets of longitudinal partitions 84 and 85, Fig. 2, divide the space between the cylinders 74 and 75 on the high pressure side B into a central passageway 86 and side passageways 87, 87a and 87b, and 88, 88a and 88b, as clearly shown in Figs. 2 and 3. The partitions 84 terminate short of their upper ends below the underplane of top plate 61 while the partitions 85 go to that top plate.

Gas (water vapor) enters passageways 87 and 88 from chamber 83 within cylinder 74 through apertures 82 and 82' positioned opposite the end passageways 87 and 88, as indicated on Fig. 3. The apertures 82' and 90, as shown in Fig. 1, are positioned to contact the bottom wall of evacuator chamber 83.

Figure 6:
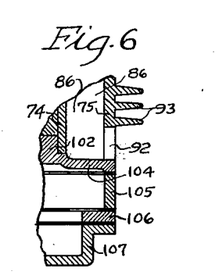
Fig. 6 is a sectional view taken on line 6—6 of Fig. 2.

The partitions 84 all extend below the oil surface indicated at 91 and 91' in Fig. 1, as is true of all the partitions 78 on the low pressure side A, but on the high pressure side B the partitions 85 are spaced at their lower parts from the oil surface 91. Hence, the travel of gas (water vapor) entering passageway 87 will be up over top of partition 84, down in passageway 87a, and under the bottom of partition 85, and up in passageway 87b, over the top of partition 84, and thence down through passageway 86 to discharge through opening 92, Fig. 6, and to go out to atmosphere below the automobile floor.

Likewise the travel of water vapor (gas) entering passageway 88 will be up over the top of partition 84, down in passageway 88a and under the bottom of partition 85, and up in passageway 88b, over the top of partition 84, and thence down through passageway 86 to discharge through opening 92 to atmosphere below the automobile floor.

By these means, gas travel from chamber 83 will be long and tortuous, with three sharp reversals of travel. Any oil particles carried by the gas will thus be effectively precipitated to join the oil in the sump on the high pressure side B, which will later be described. If greater travel of the gas and more turns should be requisite to effect complete precipitation of the oil, a series of downwardly turned alternately over-lapping baffles (not shown) may be cast in passageways 87, 87a, 87b and passageways 88, 88a, 88b.

Upon the cylinder 75 is cast a multiplicity of circumferential fins 93 which are subject to the stream of relatively moving air produced by movement of the automobile. These fins will remove the heat generated in compressing the water vapor against atmospheric pressure.

Preferably, the inner cylinder 74, the outer cylinder 75, and circumferential fins 93 and the partitions 76, 77, 78, 84 and 85 will be cast integrally, using some suitable alloy, and thereafter the upper edges of annular rim 45 and of cylinders 74 and 75 will be surfaced and ground in true planes perpendicular to the axis of the concentric cylinders. The bottoms of the cylinders likewise will be so ground, and the inside of cylinder 74 will be turned, surfaced and ground to an approximate true cylindrical form.

A plate 93' is secured to the upper edges of inner cylinder 74 by means of screws 94, Figs. 1 and 8. This plate has an annular groove 95 around its outer edge which receives and rests upon the upper annular face of cylinder 74, and is held by screws 94 which pass through an annular gasket 97 between the top wall of groove 95 and the upper part of cylinder 74, as shown in Fig. 8.

The plate 61 rests upon plate 93' and also upon the upper edge of cylinder 75 and is secured to plate 93' by screws 98 and to the upper edge of cylinder wall 75 by screws 99, with a gasket 100 between them, Figs. 1 and 8.

A lower plate 101, Fig. 1, has an upper cylinder portion 102 and a circumferential cut-out portion 103. This plate is secured to cylinder 74 by means of a press fit of the lower inside wall of cylinder 74 with the outer wall of cut-out portion 103, which is gas-tight, as shown in Fig. 1. This plate 101 is formed with an annular horizontal flange 104 which underlies the lower circular edge of cylinder 75.

A vertically-extending, ring-like member 105 underlies the flange 104 and a horizontally-extending ring-like member 106 underlies the member 105, as clearly shown in Fig. 1. A supporting casting 107 has a flange 108 which underlies the member 106.

The arrangement of flange 104, members 105 and 106 with supporting casting 107, taken in connection with the plate 101, forms a housing for shaft bearings and gears of the oiling system, which will later be described. This assemblage is held together by a multiplicity of screw bolts 109 which are threaded into lugs 110 formed on the cylinder 75, and which extend through lugs 111 on the member 105. By this means, the parts above described, together with gaskets indicated in Fig. 1, are drawn gas-tight together, yet permit assembly of the various parts.

The shaft 64 is keyed upon a rotor 112, which rotor, as clearly shown in Fig. 2, is cylindrical in its outer limits and is positioned on shaft 64 eccentric to the cylinder 74 and so its outer circumference will substantially contact the cylinder 74 at the center longitudinal line of flange 76 and will be spaced from the inner wall of cylinder 74 at the opposite point, leaving a crescent-shaped chamber 83 between the rotor 112 and the inner wall of cylinder 74.

The shaft 64 is supported by thrust bearing 113 in the part 107, by a lateral bearing 114 in the part 67 of plate 61 and a second lateral bearing 115 countersunk in plate 101. A packing nut 114', together with packing nut 69, heretofore described, maintains the shaft for rotation in a gas-tight manner.

The shaft 64 is provided with a driving bevel gear 115 which meshes with the bevel gear 116 on shaft 117, which shaft may be driven from the fan belt drive of the automobile, not shown, but shown in my aforesaid Letters Patent. The shaft 117 is supported by a bracket 118, formed integrally or connected with the supporting part 107.

Referring to Fig. 2, the rotor 112 is provided with a multiplicity of wide parallel-walled slots. In the form of Fig. 2, there are four of said slots numbered respectively 119, 120, 121 and 122. The parallel walls of these slots are spaced apart substantial distances and are milled and ground into true polished parallel planes and each of the slots has a radially movable impeller 123 mounted therein.

These impellers, as shown in Fig. 1, are short, not to exceed three inches in length, and are initially formed of round bars of steel of such short length, which are turned and ground to substantially true cylinders. Thereafter parallel smooth plane walls are formed by planing and polishing, which bring the transverse thickness of the impellers 123 to the width of the slots 119 to 122, with a very close fit of the impellers when positioned in the slots. Such fit will have a small tolerance of not to exceed one or two-thousandths of an inch. The impellers 123 thus are provided with outer and inner edge portions 124 and 125 which are segments of cylinders.

This arrangement has importance in my invention in that the contacting part of the impellers 74 has the same incidence against said cylinder in any of its positions eccentric to the inner wall of cylinder 74, and also provides angular channels 126 between said contacting portions which gather and pile up oil in front of the impellers and this definitely prevents any gas leakage between the low pressure side A and the high pressure side B of the pump.

Likewise, there are similar angular channels 127 between the inner cylindrical ends 125 and the side walls of the slots for accumulating oil to force it between the contacting walls of impellers and the slots as the impellers move radially back and forth in the slots. This effect is aided by the fact that the chambers in the slots back of the impellers are subject to the high pressure (atmospheric pressure) of the high pressure side B of the pump, as hereinafter to be described.

The upper surface of plate 101 and the lower surface of plate 93' are planed and ground true and smooth, and the impellers 123 and rotor 112, as shown in Fig. 1, have their end walls annularly ground and in close contact with the top wall of the cylindrical part 102 of plate 101 and the bottom wall of plate 93', with the contacting surfaces in true parallel planes.

Each of these plates has a pair of circular grooves cut through the above noted surfaces. The grooves in the cylindrical portion 102 of lower plate 101 are designated respectively as 128 and 129, see Fig. 1, and shown in dotted lines as to the lower plate in Fig. 2. The corresponding grooves in the upper plate 93' are designated as 130 and 131, Fig. 1. The grooves 128 and 130 face the ends of bores 132 through the impellers 123. These grooves are concentric with the inner wall of cylinder 74 so that the bores 132 through impellers 123 always face with their respective ends the grooves 128 and 130.

The groove 129 through the top wall of bottom plate 101 opens into a passageway 133 which leads through passageways 134 and 135 into the oil sump on the high pressure side B of the pump. The groove 131 is connected by a passageway 135 with the air outlet passageway 87 in the high pressure side B of the pump. By these means the portions of slots 119, 120, 121 and 122 back of the impellers are at all times subject to the high pressure of the high pressure side of the pump.

As shown in Figs. 1 and 2, the lower circular slot 129 communicates with the bottom portions of the impeller slots 119, 120, 121 and 122. It follows that the oil which accumulates in the impeller slots will gravitate to the bottoms thereof and will go back into the high pressure sump 151 through passageways 133, 134 and 135, as shown in Fig. 1. A passageway 137 leads from the upper circular groove 130 to the bearing 114, Fig. 1.

Referring to Fig. 4, the supporting part 107 is formed with an upwardly turned annular flange 138 forming a housing for gear 139 on drive shaft 64 meshing with a drive gear 140 on a stub shaft 141, which extends through plate 142 forming an inward extension of member 106, and of the same thickness as said member, as shown in Fig. 1.

Upon shaft 64 is a first gear 143 of a gear pump couple. The second gear 144 of the couple is on stub shaft 147, as shown in Fig. 4. Similarly, upon stub shaft 141 is a first gear 145 of a second pump couple, of which gear 145 is one gear and gear 146 is the second gear, as shown in Fig. 4. The gear 144 is on a stub shaft 147 and is driven by gear 143 in the direction of the arrows. The gear 146 is on stub shaft 148 and is driven in the direction of the arrows thereon.

The two gear pump couples deliver oil from sump 149 on the low pressure side A into central delivery chamber 150, and the gears 143 and 144 likewise deliver oil from the sump 151 on the high pressure side B into the same delivery chamber 150. From delivery chamber 150 the oil is delivered through a passageway 152, shown in Fig. 1 partly broken away and partly in dotted lines, to be delivered under a high pressure to the lower circular groove 128.

The high pressure oil is fed from groove 128 through the bores 132 in impellers 123, and it will be fed uniformly through said impellers in all positions thereof. The oil in turn is forced through upper ends of bores 132, where it is fed to all parts of the groove 130.

This oil at high pressure is forced between the contacting end faces of impellers 123 and rotor 112 and faces of plates 102 and 93', moving outwardly in all directions along those faces from grooves 128 and 130, and, in small amounts, passing into crescent-shaped chamber 83 outside the impellers and into the impeller slots 119, 120, 121 and 122.

The oil in crescent-shaped chamber 83 piles up in and at the front of the wedge-shaped parts 126 between the outer impeller walls and the inner wall of cylinder 74 where it effectively lubricates the contacting parts of the impeller and cylinder wall and prevents any cross leakage at those points.

Also the oil moving under high pressure over the ends of impellers and the rotor prevents any cross leakage through these contact areas, and a part of the oil spills into the slots 119 to 122 where it tends to back up against the wedge-shaped passages 127 at each side of the impellers and along the faces of the slots and lubricates the moving faces of the slots and prevents leakage along the slot walls.

The oil which spills into crescent chamber 83 on the low pressure side A will gravitate to the bottom of said chamber and ultimately will discharge through openings 82' at the level of said bottom into the low pressure sump 149. Some of the oil in crescent-shaped chamber 83 will also be returned to the high pressure sump through openings 90 at the level of the floor on the high pressure side B.

The oil which spills into the impeller slots 119, 120, 121 and 122 will gravitate to the bottom of said slots and will be pushed by the return movements of the impeller and also by the high pressure gas in the slots which is additionally compressed by the backward movement of the impeller first into annular channel 129 and from there through passageways 133, 134 and 135 into the high pressure sump 151.

By adjusting the relative areas of openings 82' and 90, which adjustment may have to be determined empirically, the amount of oil to the respective low pressure sump 149 and high pressure sump 151 may be equalized so that the oil content of the two sumps remains constant.

Resting upon the plate 142 over gaskets between it and said plates is a housing member 153, Fig. 4. The member 153 is formed with central thickened portions 154 and 155 which form semi-cylindrical housings 156 and 157 for the pump gear couple 143 and 144, and housings 158 and 159 for the pump gear couples 145 and 146, as clearly shown in Fig. 4. The member 153 also provides center bearings for stub shafts 141, 147 and 148.

This member is integrally connected by webs 160 and 161 with the member 105 heretofore described, and these webs are in line with the webs 76 and 77 on the casting forming the cylinders 74 and 75 and with other correspondingly positioned webs on members 104, 106 and 107. Gaskets are between the contacting faces of the several webs and the screw bolts 109 draw the assemblage together gas-tight, thus entirely separating the oil sump 149 on the low pressure side A from the oil sump 151 on the high pressure side B, excepting for a passageway 162 leading from low pressure oil sump 149 to the pump gear couple 145, 146, and for a second oil passageway 163 leading from high pressure oil sump 151, as clearly shown in Fig. 4.

In operation this arrangement causes the oil to be moved by the gear pump couples from the opposite and otherwise segregated oil sumps to the pressure chamber 150, from which it is distributed under high pressure to the moving contact surfaces of the pump and returned to the sumps as heretofore described.

Oil is supplied to the high pressure oil sump 151 through an opening 164 closed by a screw cap 165. The lower edge 166 of the opening 164 is positioned below the top wall of plate portion 102, as shown in Fig. 1, hence oil supply is self-leveling to the level 91 in oil sump 151. In a similar manner, oil is delivered from similar mechanism 167 to the low pressure oil sump 149.

From an opening 168, Fig. 1, in the bottom wall of member 107 drainage of the high pressure oil sump 151 may take place controlled by a hand operated cock 169. Similarly, through an opening 170, oil is drained from the low pressure sump 149, controlled by hand operated cock 171. These cocks are located to drain the liquid from the lowest points of the respective sumps 149 and 151.

It follows that if any water condenses in the system and goes to the sumps, it will gravitate to this low point and may be drained out from time to time as oil is supplied at filling stations or similar places where oil is sold, preferably at filling stations or garages having under-body pits. The water in chamber 53 of cylinder tank 19 may be drained away as desired through hand operated drainage cock 172.

Figure 7:
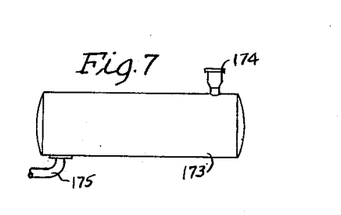
Fig. 7 illustrates how a water tank carried on the underside of an automobile frame, as indicated in my aforesaid patent, will be connected to the float valve for maintaining an operative level of water in the evaporator tank.

The introduction of water into this tank, both initially and to supply loss from evaporation, will be effected by air pressure when the rotor is in operation. This pressure is exerted upon the water in a tank 173 carried by the automobile. This tank is provided with a breather cap 174, and is connected by pipe 175 with valve 176 which is opened and closed by float 177 in a well-known manner.

When, therefore, pressure is reduced in chamber 53 within cylinder 29, and the water level drops to cause opening of valve 176, air pressure on the surface of the water in tank 173 will force water into chamber 53 until the float 177 closes the valve 176, and thereafter, whenever float 177 sinks to a point to open valve 176, additional water will be similarly supplied to replace that removed from chamber 53 by evaporation.

The device in operation will not only cool the air within the compartment of an automobile, but, almost as important, it will remove substantial quantities of moisture from the air, for the air circulating through the numerous heat exchange passages in contact with the cold walls thereof, will cause heavy condensation on all said walls. This condensate will gravitate down these walls to discharge at the bottom thereof.

A pan 178 has an out-flaring, up-standing wall 178' positioned to underlie the annular lower edge 179' which extends around the bottom of cylinder 19. The pan has a bottom wall 179 formed with an annular upstanding lip 180, Fig. 1, through which extends the support casting 69 for the fan operating mechanism, and there is also provided an inverted pan 181 which surrounds and is preferably soldered to the casing member 46.

All the water which accumulates and flows down the cold heat exchange surfaces will be deposited in the pan 179. The bottom wall of said pan slopes from left to right and the water drains out from the lower part of said bottom wall to the right, as shown in Fig. 1, through one or more discharge pipes 182.

These pipes are positioned immediately in front of the radiating fins 93, and the cold water condensed within the system and discharged through pipes 182 is caused by air currents from movement of the car to spatter against the radiating fins 93. Both the low temperature of this water and the evaporation thereof materially aids in withdrawing heat generated by compression of the evacuated water vapor against outside air pressure.

The advantages of my invention clearly appear from the foregoing description and from its mode of operation, which is as follows:

The unitary casing which contains the entire apparatus is positioned upon the floor of an automobile, with the upper casing portion 10 within the chamber of the automobile and the lower casing portion 11 projected through the floor of the automobile to extend into the space under the automobile and above the ground.

These parts are positioned level upon the automobile floor. The drive shaft 117 is connected with a driven part of the automobile engine, preferably the fan belt pulley, not shown, and the pipe 175 from a tank of water 173 on the automobile body is connected with the valve 176 through a connector elbow 183. A clutch, not shown, but shown in my aforesaid patent, is adapted to make the connection at will between the drive shaft 117 and the automobile engine.

Suitable oil has been introduced into the respective low pressure sump 149 and high pressure sump 151 to the level permitted by inlet control means 164, 165 and 167.

The automobile engine is started and immediately the oiling system forces oil at high pressure upon the contact surfaces of the moving rotor and impellers. These reduce air pressure in the chamber 53 with the result that water is drawn from tank 173 to fill the chamber 53 to the level 54 when the float valve cuts off injection of water.

The rotor is driven at high speed, 1,750 R. P. M. when the automobile is driven between 50 and 60 miles per hour. The impellers, acting as evacuating pistons, rapidly reduce the pressure in the chamber 53 to a low pressure, which may approximate around .15 of a pound per square inch. Under this high degree of vacuum the air in chamber part 53 is first evacuated then water vapor, boiling out of the water in chamber 24, which has its level at 154, is rapidly evacuated. The gas, whether air or water vapor, leaves chamber 53 by passing under cap 49 and through passageways 46 and 60 into the annular passageway 81 connected with the vertical channels 79 and 80. From there it enters crescent-shaped pump chamber 83.

The evacuated gas is discharged from chamber 83 in the pump cylinder 74 through openings 89 and 90 into passageways 87 and 88 from which, by a tortuous route, as heretofore described, it reaches vertical passageway 86 and discharges therefrom to outdoors through opening 92. The rapid evaporation of water in tank chambers 24 and 53 takes heat, first from the water in chamber 53 and then from the air drawn over the cooled heat exchange surfaces formed in and about the tank in cylinder 19, and is discharged by the fan 39 directly into the automobile chamber.

The temperature of the water will by this means be dropped to somewhere in the neighborhood of 40° F. The moving air contacting the cooled heat exchange surfaces will itself be cooled and will precipitate water condensed from the air of the automobile compartment. Condensed water will accumulate in the bottom 179 of pan 178, and will flow down its slope to discharge through pipes 182. There it will be spattered over radiator fins 123 as they are moved through the air outside the automobile compartment by the forward movement of the automobile.

In this manner, as heretofore pointed out, the heat resulting from compression of the water vapor gas against atmospheric pressure will be withdrawn from the apparatus and dissipated outdoors.

Meanwhile the gear pump couples 143, 144 and 145, 146 will draw oil from the respective high pressure sump 151 and low pressure sump 149 to build up high oil pressure in the pressure chamber 150, while at the same time effectively blocking leakage between the high pressure and low pressure sides of the pump. From the high pressure chamber 150 the oil travels through duct 152 and the bores 132 to the annular grooves 129 and 130, where it is distributed to all moving surfaces of the rotor and impellers and effectively prevents any cross leakage.

The oil pump gear couples, the rotor, including the impellers and the fan, that is all the driven parts of the entire assemblage, are driven from the shaft 64. Thus the whole arrangement is compactly assembled in what amounts to a single casing, and, when connected to a driven member of the automobile engine, operates automatically to effect cooling and dehydrating of the air within the automobile chamber. All that the automobile operator has to do at any time is to connect and disconnect the driving shaft and to see that the water tank 173 is not allowed to become empty, this merely requiring that it be filled with water from time to time as conditions require, and which can be conveniently done at any filling station.

I claim:

1. An automobile cooling air conditioner, comprising a unit casing supported upon the floor of an automobile having a portion above said floor in the automobile compartment, a combined tank and heat exchanger formed in said portion and adapted to contain a supply of water, a multiplicity of heat exchange passages extending vertically through and about said tank and the water therein and adapted to be contacted by currents of air drawn through them, a fan above the tank for moving said currents of air, an evacuating pump in another part of said casing, a vertical conduit opening at the top of the tank above the surface of the water therein and connected with the pump for conveying air and water vapor from the tank to the pump, and means including a driven shaft for simultaneously operating the pump and the fan.

2. An automobile cooling air conditioner, comprising a casing portion having therein an evacuating pump consisting of a cylinder, a cylindrical rotor eccentrically positioned in the cylinder and contacting it at one side, parallel-walled radial slots formed in the rotor and opening outwardly, impellers radially movable in said slots having end walls contacting the inner cylindrical wall of the cylinder, oil sumps in the casing part, one for the high pressure side of the pump and the other for the low pressure side of the pump, an oil pump between the sumps, said sumps individually connected with the oil pump but otherwise individually separated one from the other, said oil pump and conduit connections adapted to force oil at high pressure over the contact faces of the rotor and the impellers, and a driven shaft connected with and operating the rotor and the oil pump.

3. An automobile cooling air conditioner, comprising a casing portion having therein a rotary evacuating pump, a second casing portion having therein a tank adapted to contain a supply of water and to act as a cooling air conditioner and having a passageway extending vertically through the tank from above the surface of the water therein into the second casing portion and to the pump, the pump operating to evacuate water vapor from the tank and thereby cool the water in the tank by evaporation, the pump having a high pressure side and a low pressure side, an oil sump for each side, an oil pump between the sumps, said sumps individually connected with the oil pump, means otherwise individually separating one sump from the other, said oil pump having conduit connections adapted to force oil at high pressure to the evacuating pump, and a driven shaft connected with and operating the evacuating pump and the oil pump.

4. An automobile cooling air conditioner, comprising a casing portion having therein a rotary pump, a tank and a conduit between the pump and the tank to evacuate water vapor from the tank and thereby cool water in the tank by evaporation, the pump having a high pressure side and a low pressure side, an oil sump for each side, each sump extending to the bottom of the casing portion, an oil pump between the sumps having pumping connection with both sumps, means otherwise individually separating one sump from the other, and a drainage cock entering each sump at its bottom, whereby any water which may be introduced into the sumps or either of them may be withdrawn therefrom independently of the oil therein.

5. An automobile cooling air conditioner, comprising a casing portion having therein a rotary pump, a tank and a conduit between the pump and the tank to evacuate water vapor from the tank and thereby cool water in the tank by evaporation, the pump having a high pressure side and a low pressure side, an oil sump for each side, each sump extending to the bottom of the casing portion, an oil pump between the sumps having pumping connection with both sumps, means otherwise individually separating one sump from the other, and a filling cock for each sump positioned so the maximum level of oil in the sumps will be below the bottom of the pump.

6. An automobile cooling air conditioner, comprising a casing portion having therein a rotary pump, a tank and a conduit between the pump and the tank to evacuate water vapor from the tank and thereby cool water in the tank by evaporation, the pump having a high pressure side and a low pressure side, an oil sump for each side, each sump extending to the bottom of the casing portion, an oil pump between the sumps having pumping connection with both sumps, means otherwise individually separating one sump from the other, a filling cock for each sump positioned so the maximum level of oil in the sumps will be below the bottom of the pump, and a drainage cock entering each sump at its bottom, whereby any water which may be introduced into the sumps or either of them may be withdrawn therefrom independently of the oil therein.

7. An automobile cooling air conditioner, comprising a casing portion having therein a rotary pump, a tank and a conduit between the pump and the tank to evacuate water vapor from the tank and thereby cool water in the tank by evaporation, the pump having a high pressure side and a low pressure side, an oil sump for each side, each sump extending to the bottom of the casing portion, an oil pump between the sumps having pumping connection with both sumps, means otherwise individually separating one sump from the other, a system of conduits connected with the oil pump for conveying oil to all moving contact surfaces of the rotary pump, and sets of openings from the rotary pump for returning the oil to the respective sumps.

8. An automobile cooling air conditioner, comprising a casing portion having therein a rotary pump, a tank and a conduit between the pump and the tank to evacuate water vapor from the tank and thereby cool water in the tank by evaporation, the pump having a high pressure side and a low pressure side, an oil sump for each side, each sump extending to the bottom of the casing portion, an oil pump between the sumps having pumping connection with both sumps, means otherwise individually separating one sump from the other, a system of conduits connected with the oil pump for conveying oil to all moving contact surfaces of the rotary pump, and sets of openings from the rotary pump for returning the oil to the respective sumps, the areas of said respective sets of openings being so proportioned relatively that the same volume of oil will be returned to each of the sumps.

9. An automobile cooling air conditioner, comprising a casing portion having therein a rotary pump, a tank adapted to hold water having a series of vertical passages formed in the casing about the pump in two separated sets, one set being connected with the pump for gas inlet and the other set being connected with the pump for gas outlet, a conduit between the gas inlet passageways and the tank, an opening formed in the casing leading from the gas outlet passages to outdoors, an air tight tank adapted to hold water, and a conduit connecting the tank above the water line with the pump whereby the pump will evacuate water vapor from the tank and thereby cool the water in the tank by evaporation.

10. An automobile cooling air conditioner, comprising a casing portion having therein a rotary pump, a series of vertical passages formed in the casing about the pump in two separated sets, one set being connected with the pump for gas inlet and the other set being connected with the pump for gas outlet, a conduit between the gas inlet passageways and the tank, an opening formed in the casing leading from the gas outlet passages to outdoors, an air tight tank adapted to hold water, and a conduit connecting the tank above the water line with the pump whereby the pump will evacuate water vapor from the tank and thereby cool the water in the tank by evaporation, and a pair of separated oil sumps, all the inlet passageways opening at their bottoms into one of said sumps and all of the outlet passageways opening at their bottoms into the other of said sumps.

11. An automobile cooling air conditioner, comprising a casing portion having therein a rotary pump, a series of vertical passages formed in the casing about the pump in two separated sets, one set being connected with the pump for gas inlet and the other set being connected with the pump for gas outlet, a conduit between the gas inlet passageways and the tank, an opening formed in the casing leading from the gas outlet passages to outdoors, an air tight tank adapted to hold water, and a conduit connecting the tank above the water line with the pump whereby the pump will evacuate water vapor from the tank and thereby cool the water in the tank by evaporation, the outlet passageways being constructed and arranged in the casing part relative to the openings thereinto so as to give a tortuous travel to the outlet gases, whereby oil particles carried thereby will be precipitated therefrom and go into the sump.

12. An automobile cooling air conditioner, comprising a unit casing having two portions, one of said portions adapted to be carried within the compartment of the automobile and the other portion being projected through the floor of the automobile to outdoors, a combined evaporating tank and heat exchanger in the first named portion adapted to hold a supply of water therein, an evacuating pump in the second portion provided with a conduit connection for withdrawing water vapor from the tank, radiator fins projecting from the second portion to be contacted by the relatively moving air while the automobile is being driven, and a pipe for discharging water of condensation from the second portion of the casing upon the radiator fins, whereby water condensed upon the heat exchanger passages of the tank will be directed to the radiator fins and will aid in removing heat generated by the pump by compression of the water vapor.

13. In combination with an automobile, an automobile cooling air conditioner, comprising a unit casing supported upon the floor of the automobile and having upper and lower portions one above the other, the upper portion being positioned within the compartment of the automobile and the lower portion being projected through the floor of the automobile to outside, a water holding member in the upper compartment, mechanism in the lower compartment connected with the water holding member above the water line therein for evacuating water vapor therefrom, mechanism for effecting oiling of contacting surfaces of the evacuating mechanism, and a single vertical shaft extending into both upper and lower portions having driving connection with the automobile engine for simultaneously driving said evacuating and oiling mechanisms.

14. In combination with an automobile, an automobile cooling air conditioner, comprising a unit casing supported upon the floor of the automobile and having upper and lower portions one above the other, the upper portion being positioned within the compartment of the automobile and the lower portion being projected through the floor of the automobile to outdoors, a combined evaporator tank and heat exchanger within the first named portion adapted to hold a supply of water therein, said tank being sealed from admission of outside air, means to maintain a water level therein to leave an evaporating chamber above the surface of the water, and an evacuating pump in the lower portion provided with a direct conduit connection to the chamber also sealed from outside atmosphere for withdrawing gas from and producing negative pressure in said chamber.

15. In combination with an automobile, an automobile cooling air conditioner, comprising a unit casing supported upon the floor of the automobile and having upper and lower portions one above the other, the upper portion being positioned within the compartment of the automobile and the lower portion being projected through the floor of the automobile to outside, said second portion having therein a gas evacuating pump, and radiator fins integral with walls of and projecting from said second portion in position to be contacted by the relatively moving air as the automobile is driven.

16. In combination with an automobile, an automobile cooling air conditioner positioned on the floor of the automobile, comprising a part thereof extending below the floor of the automobile, said part including a single cylindrical casting embodying a central cylindrical chamber, walls surrounding the chamber having formed therein two sets of passageways, one set for gas inlet, and the other set for gas outlet, one of said gas outlet passages having an opening for discharging gas outside, said casting having a multiplicity of fins extending outwardly from the casting in position to be contacted by the relatively moving air when the automobile is driven.

17. In combination with an automobile, an automobile cooling air conditioner positioned on the floor of the automobile, comprising a part thereof extending below the floor of the automobile, said part including a cylindrical casting embodying a central cylindrical chamber, walls surrounding the chamber having formed therein two sets of passageways, one set for gas inlet and the other set for gas outlet, one of said gas outlet passages having an opening positioned for discharging the gas outside, said casing having a multiplicity of surrounding parallel fins extending outwardly from the casting in position to be contacted by the relatively moving air when the automobile is driven.

18. In combination with an automobile, an automobile cooling air conditioner positioned on the floor of the automobile, comprising a part thereof extending below the floor of the automobile, said part including a single cylindrical casting embodying a central cylindrical chamber, walls surrounding the chamber having formed therein two sets of passageways, one set for gas inlet, and the other set for gas outlet, one of said gas outlet passages having an opening for discharging gas outdoors, said casting having a multiplicity of fins extending outwardly from the casting in position to be contacted by the relatively moving air when the automobile is driven, said chamber having its inner wall ground and polished to a true cylinder and forming part of a gas evacuating pump.

19. In combination with an automobile, an automobile cooling air conditioner, comprising a unit casing supported upon the floor of the automobile and having upper and lower portions one above the other, the upper portion being positioned within the compartment of the automobile and the lower portion being projected through the floor of the automobile to outside, a tank in said first named portion adapted to hold water with means to maintain the water therein at a predetermined level to leave an evaporating chamber above the surface of the water, a multiplicity of gas passages extending through and about the tank including a passageway housing a shaft, and said shaft, a fan on the end of the shaft, an evacuating pump in the second portion provided with a conduit chamber, a second shaft extending through the lower portion in alignment with the shaft of the first portion having driven connection with the automobile engine for driving the evacuating mechanism, and speed reducing gearing connecting the second shaft with the first shaft for driving the fan.

20. In combination with an automobile, an automobile cooling air conditioner, comprising a unit casing supported upon the floor of the automobile and having upper and lower portions one above the other, the upper portion being positioned within the compartment of the automobile and the lower portion being projected through the floor of the automobile to outdoors, a combined evaporator tank and heat exchanger within the upper portion adapted to hold a supply of water therein having a sealed chamber with top, bottom and side walls, a multiplicity of tubular air passageways connecting the top and bottom walls and giving rigid support to said walls against outside air pressure, some of said tubular members having longitudinal contact with the side walls to give lateral support thereto against air pressure, and an evacuating pump in the first portion having conduit connection with the upper portion of said sealed chamber.

FRANK A. WHITELEY.

REFERENCES CITED

The following references are of record in the file of this patent:

UNITED STATES PATENTS

| Number | Name | Date |
|---|---|---|
| 1,051,360 | Wisdom | Jan. 21, 1913 |
| 2,057,447 | Replogle | Oct. 13, 1936 |
| 2,178,425 | Johnson | Oct. 31, 1936 |
| 2,336,735 | Jones | Dec. 14, 1943 |
| 2,352,748 | Whiteley | July 4, 1944 |